(12) United States Patent
Lodico et al.

(10) Patent No.: US 8,458,604 B2
(45) Date of Patent: Jun. 4, 2013

(54) METHODS AND APPARATUS FOR DETERMINING WEBSITE VALIDITY

(75) Inventors: Philip Michael Lodico, Washington, DC (US); Joshua Slocum Bourne, Bethesda, MD (US)

(73) Assignee: Fairwinds Partners LLC, Washington, DC (US)

( * ) Notice: Subject to any disclaimer, the term of this patent is extended or adjusted under 35 U.S.C. 154(b) by 875 days.

(21) Appl. No.: 12/498,092

(22) Filed: Jul. 6, 2009

(65) Prior Publication Data

US 2011/0004850 A1    Jan. 6, 2011

(51) Int. Cl.
*G06F 3/00* (2006.01)
*G06F 3/01* (2006.01)

(52) U.S. Cl.
USPC .......... 715/760; 715/205; 715/206; 715/234; 715/772

(58) Field of Classification Search
USPC .................. 715/205, 206, 234, 760, 772
See application file for complete search history.

(56) References Cited

U.S. PATENT DOCUMENTS

| | | | |
|---|---|---|---|
| 5,812,769 A | 9/1998 | Graber et al. | |
| 5,835,718 A | 11/1998 | Blewett | |
| 5,950,172 A * | 9/1999 | Klingman | 705/27.1 |
| 6,151,601 A | 11/2000 | Papierniak et al. | |
| 6,393,479 B1 | 5/2002 | Glommen et al. | |
| 6,442,602 B1 | 8/2002 | Choudhry | |
| 6,480,508 B1 | 11/2002 | Mwikalo et al. | |
| 6,826,624 B1 | 11/2004 | Fell, Jr. | |
| 6,907,525 B2 | 6/2005 | Pazi et al. | |
| 6,973,507 B2 | 12/2005 | Yoon et al. | |
| 6,993,590 B1 | 1/2006 | Gauthier et al. | |
| 7,003,555 B1 | 2/2006 | Jungck | |
| 7,089,325 B1 | 8/2006 | Murtza et al. | |
| 7,225,272 B2 | 5/2007 | Kelley et al. | |
| 7,260,774 B2 | 8/2007 | Lambert et al. | |
| 7,299,491 B2 | 11/2007 | Shelest et al. | |
| 7,340,533 B2 | 3/2008 | Murtza et al. | |
| 7,349,827 B1 | 3/2008 | Heller et al. | |
| 7,383,282 B2 | 6/2008 | Whitehead et al. | |
| 7,428,592 B2 | 9/2008 | Lee et al. | |
| 2003/0163567 A1 | 8/2003 | McMorris et al. | |
| 2006/0042483 A1 * | 3/2006 | Work et al. | 101/91 |
| 2006/0095586 A1 | 5/2006 | Adelman et al. | |
| 2007/0143266 A1 * | 6/2007 | Tang et al. | 707/3 |
| 2007/0239701 A1 | 10/2007 | Blackman et al. | |
| 2007/0250919 A1 | 10/2007 | Shull et al. | |
| 2008/0034211 A1 | 2/2008 | Shull et al. | |
| 2008/0140442 A1 | 6/2008 | Warner | |
| 2008/0162698 A1 | 7/2008 | Hopen et al. | |
| 2008/0214153 A1 * | 9/2008 | Ramer et al. | 455/414.1 |

(Continued)

FOREIGN PATENT DOCUMENTS

WO        WO 02/48830        6/2002

*Primary Examiner* — Nicholas Augustine
(74) *Attorney, Agent, or Firm* — Cooley LLP

(57) ABSTRACT

In one embodiment, a computer-readable medium comprises code representing instructions to cause a processor to receive a fetch response based on a webpage address that may be associated with a webpage. The code can additionally represent instructions to calculate a webpage validity score for the webpage. The validity score can be based on at least one of content or metadata associated with the webpage. The code can also represent instructions to cause the processor to store a thumbnail image of the webpage, along with an indicator of the validity score. The validity indicator can be based on the webpage validity score and a threshold value.

23 Claims, 10 Drawing Sheets

U.S. PATENT DOCUMENTS

2008/0235721 A1* 9/2008 Ismail et al. .................... 725/16
2008/0256046 A1 10/2008 Blackman et al.
2009/0271283 A1* 10/2009 Fosnacht et al. ................ 705/26
2010/0063877 A1* 3/2010 Soroca et al. ............. 705/14.45

* cited by examiner

600

| Webpage Address 610 | Validity Score 620 | Validity Indicator 630 | Thumbnail File Location 640 |
|---|---|---|---|
| Address$_1$ | -3 | Substantive | File$_1$ |
| Address$_2$ | 7 | Pay-per-click | File$_2$ |
| Address$_3$ | null | Does not resolve | File$_3$ |

| Registrar Name 710 | Registrant Name 720 | Name Server 730 |
|---|---|---|
| RegistrarName$_1$ | RegistrantName$_1$ | NameServer$_1$ |
| RegistrarName$_2$ | RegistrantName$_2$ | NameServer$_2$ |
| RegistrarName$_3$ | RegistrantName$_3$ | NameServer$_3$ |
| ... | ... | ... |
| RegistrarName$_P$ | RegistrantName$_P$ | NameServer$_P$ |

FIG. 7

METHODS AND APPARATUS FOR DETERMINING WEBSITE VALIDITY

BACKGROUND

Embodiments described herein relate generally to webpage content analysis including, for example, methods and apparatus for programmatically determining the validity of one or more webpages.

Owners of viable brands derive benefit from Internet traffic directed to their web content. To maximize this benefit, such owners often seek to avoid potential consumer confusion occasioned by the inappropriate use of Internet domain names similar to their own. For example, a third party may create a web page under a domain name that contains unauthorized content relating to the brand owner's product—thereby confusing visitors as to the page's true source. Additionally, brand owners often seek to avoid negative impressions that can result when a website with an Internet domain name similar to the name of the brand owner's product or service includes questionable content (such as pornographic material, content related to criminal activity, defamatory content, etc.), or links to such content. More particularly, brand owners may seek to know which webpages associated with such domain names contain at lease some substantive (non-advertising) content, and which contain a mere plurality of hyperlinks to other webpages as a revenue-generating device. Those in the latter category are often referred to as pay-per-click sites.

To police third-party activity of the type described above, a brand owner can first be aware of which particular Internet domain names with lexicographical similarity to their own company, product, or service names contain content and/or hyperlinks to content likely to induce consumer confusion. Due to the sheer volume of potentially-problematic domain names similar to a given brand, however, this task can be both time- and cost-intensive.

Thus, a need exists for methods and apparatus that programmatically determine the validity of a webpage in a sufficiently robust and accurate way.

SUMMARY

In one embodiment, a computer-readable medium comprises code representing instructions to cause a processor to receive a fetch response based on a webpage address that may be associated with a webpage. The code can additionally represent instructions to calculate a webpage validity score for the webpage. The validity score may be based on at least one of content or metadata associated with the webpage. The code can also represent instructions to cause the processor to store a thumbnail image of the webpage, along with an indicator of the validity score. The validity indicator can be based on the webpage validity score and a threshold value.

BRIEF DESCRIPTION OF THE DRAWINGS

FIG. 6 is a tabular diagram that illustrates a validity score database configured to store website validity score information, according to an embodiment.

FIG. 7 is a tabular diagram that illustrates a pay-per-click affiliation database, according to an embodiment.

DETAILED DESCRIPTION

Figure 1:
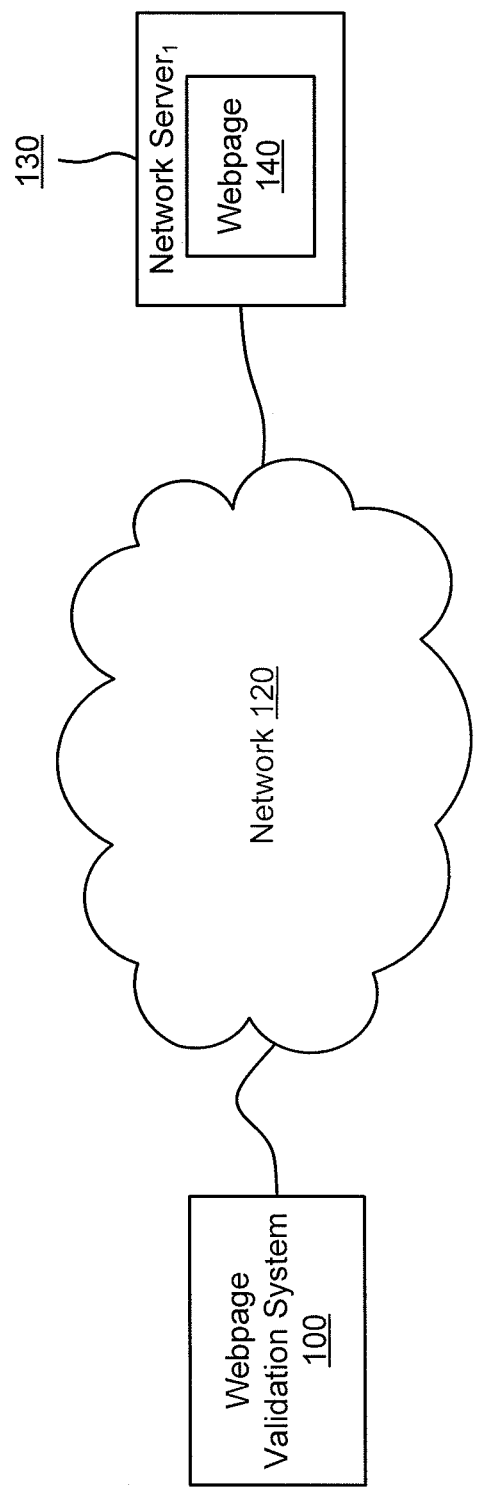
FIG. 1 is a schematic diagram that illustrates a webpage validation system coupled to a network and network server, according to an embodiment.

A webpage validation system can be configured to receive a webpage address purportedly (asserted to be) associated with a webpage and send a request across a network for the webpage. In some embodiments, the webpage validation system can communicate with one or more web servers over the Internet to send, receive and log signals including information associated with a webpage address. In some embodiments the information may include the uniform resource locator of a different webpage that the webpage address ultimately resolves to after a URL forward from the originally-requested webpage. The information may also optionally include information regarding the webpage visitor such as IP address, location, etc. In some embodiments, the webpage validation system can be further configured to receive a fetch response based on the webpage address and calculate a webpage validity score for the webpage.

The webpage validity score can be based on, for example, at least one of: a ratio of hyperlinks in the webpage to the content in the webpage, a ratio of external hyperlinks in the webpage to the total number of hyperlinks in the webpage, a size of the webpage (measured in bytes), webpage metatags, a degree of presence of advertising on the webpage, whether the registrar, registrant, or DNS server affiliated with the webpage is often known to be affiliated with pay-per-click sites or cybersquatting, etc. In some embodiments, the webpage validity score can additionally be at least partially-based on whether the number of inbound links from a search engine to the webpage is greater than a threshold value or whether the webpage contains certain types of substantive content. The webpage validation system can also be configured to compare the validity score to a pre-defined threshold to determine if the webpage contains substantive content and assign a validity indicator based on the comparison. The validity indicator can include, for example, textual or numerical information indicating that the webpage does not resolve, is a pay-per-click page, or contains substantive content. The webpage validation system can also be configured to compare the validity score to a previous validity score calculation for the webpage to detect a change in the webpage. To account for URL forwarding, the webpage validation system can optionally be further configured to compare the final URL of the webpage (where the webpage address ultimately resolves after a URL forward) to a previous final URL (where the webpage address has resolved to previously). The system can detect a change in the ultimate destination URL for the webpage and report the change to a user or factor the change in as part of the validity score calculation.

Additionally, the webpage validation system can be configured to generate a thumbnail of the webpage. In some embodiments, the webpage validation system can be configured to output the results of one or more validity score calculations, along with the resolved URL and thumbnail image for each webpage, to a display device.

In some embodiments, the webpage validation system can be configured to include a batch module. The batch module can be configured to run the sequence of steps (or a portion of those steps) described above for multiple webpage addresses, referred to as a batch process. In some embodiments, the batch module can be configured to allow a user to, for example, schedule or cancel a batch process, view a batch process status report, or view batch process results information.

In some embodiments, the webpage validation system can be a hardware-based module and/or a software-based module. In some embodiments, the webpage validation system can include at least one of a communication module, a validity score module, and a thumbnail generation module. The communication module can be configured to send and receive signals including information associated with, for example, calculating a validity score, scheduling or executing a batch process, or outputting validity score results to a display. The thumbnail generation module can be configured to generate a thumbnail image representing a visual display of a webpage in a web browser. In some embodiments, one or both of the validity score module and thumbnail generation module can be connected to the webpage validation system via a network.

In some embodiments, the webpage validation system can be connected to a separate thumbnail-generating entity over a network, such as the Internet. The webpage validation system can be configured to send a signal including a request for a thumbnail images of a webpages associated with a webpage addresses to the thumbnail-generating entity.

In some embodiments, the webpage validation system can be connected to a validity score database over a network. The validity score database can be configured to receive and store in a memory validity score information included in one or more signals sent from the webpage validation system. In some embodiments, the validity score database can be further configured to send a signal including stored webpage validity information to the webpage validation system.

FIG. 1 is a schematic diagram that illustrates a webpage validation system 100 connected to a network server 130 containing a webpage 140, via a network 120. More specifically, FIG. 1 illustrates a webpage validation system 100 configured to receive a fetch response associated with a webpage 140 and calculate a webpage validity score for the webpage 140, according to an embodiment. The webpage validation system 100 can be, for example, a hardware-based module (e.g., a processor, an application-specific integrated circuit (ASIC), a field programmable gate array (FPGA)). The webpage validation system 100 could also be a software-based module residing on a hardware device (e.g., a processor) or in a memory (e.g., a RAM, a ROM, a hard disk drive, an optical drive, other removable media) coupled to a processor. The network 120 could be, for example, a local area network, a wide area network, or the Internet. The network server 130 could be, for example, a web server or other device capable of serving web content. The webpage 140 could be, for example, a Hypertext Markup Language (HTML) document, a Common Gateway Interface (CGI) script, a Microsoft Active Server Page (ASP), a Java Server Page (JSP), a Cold-Fusion Markup Language (CFML) document, or other web document viewable by a web browser and rendered in HTML.

The webpage validation system 100 can be configured to send a webpage request for webpage 140 to the network server 130 over the network 120. In some embodiments, the webpage request can include a webpage address associated with a webpage. The webpage validation system 100 can also be configured to receive a fetch response associated with the webpage 140 from network server 130, via the network 120. In some embodiments, the fetch response can include webpage request status information and webpage content. The webpage validation system 100 can be further configured to calculate a webpage validity score for the webpage 140.

Figure 2:
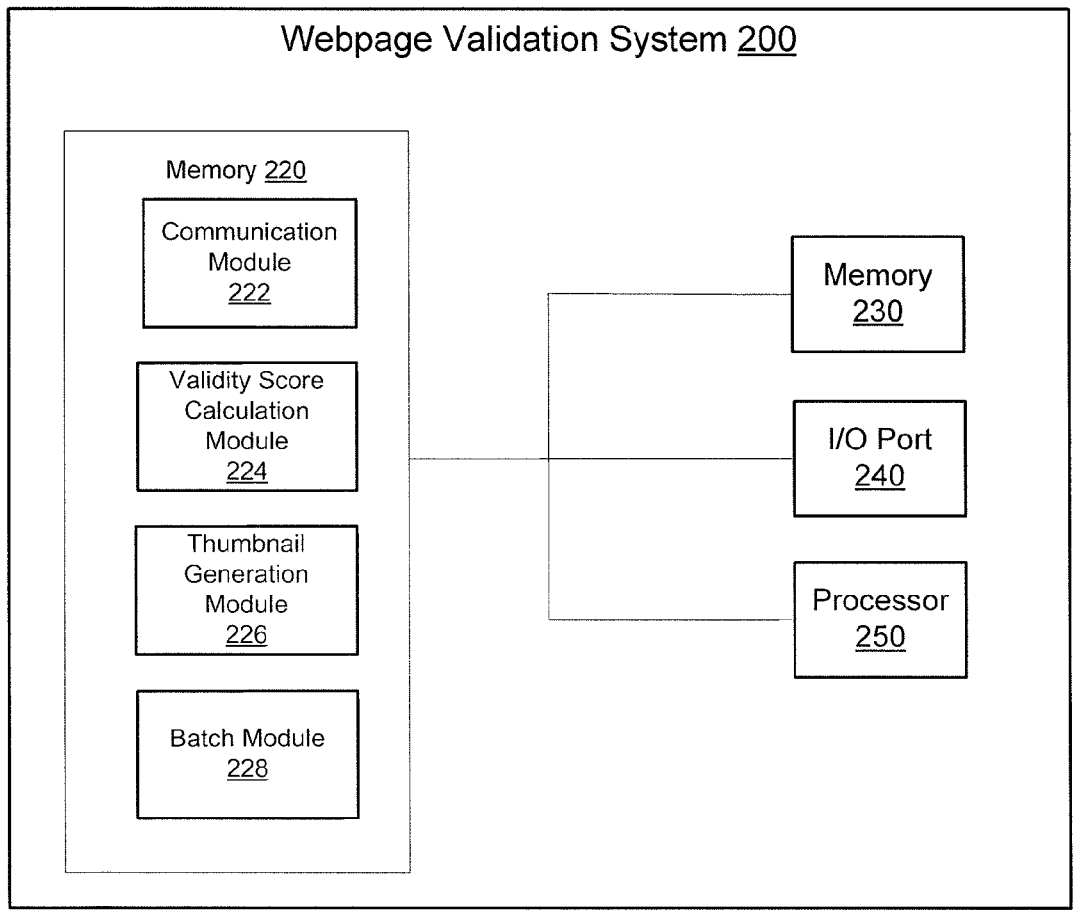
FIG. 2 is a schematic block diagram that illustrates a webpage validation system, according to an embodiment.

FIG. 2 is a schematic block diagram that illustrates a webpage validation system 200, according to an embodiment. The webpage validation system 200 can be configured to include a memory 220, a memory 230, an input/output ("I/O") port 240, and a processor 250. The memory 220 can be configured to include a communication module 222, a validity score calculation module 224, a thumbnail generation module 226, and a batch module 228. In some embodiments, the memory 220, memory 230, I/O port 240, and processor 250 could be connected, for example, via integrated circuit. Although shown as being within a single location, in some alternative embodiments, the two memory modules, I/O port, and processor could be connected over a network, such as a local area network, a wide area network, or the Internet.

The memory 220 can be any type of memory such as, for example, a read-only memory (ROM) or a random-access memory (RAM). In some embodiments, the memory could be, for example, any type of computer-readable media, such as a hard-disk drive, a compact disc read-only memory (CD-ROM), a digital video disc (DVD), a Blu-ray disc, a flash memory card, or other portable digital memory type. The memory 220 can be configured to send signals to and receive signals from the memory 230, the I/O port 240, and the processor 250.

The communication module 222 can be configured to receive a webpage address. In some embodiments, the communication module 222 can be configured to receive a webpage. For example, communication module 222 could receive a webpage address via user input or in a file received from across a network. Alternatively, the communication module could be configured to receive a webpage address from a memory 230. The communication module 222 can be configured to send a webpage request signal, based on a webpage address. The communication module 222 can be further configured to receive a signal including a fetch response associated with a webpage. The communication module 222 can be configured to send a signal including web content associated with a fetch response to the validity score calculation module 222. The communication module 222 can also be configured to send a signal including a webpage address associated with a webpage to thumbnail generation module 226.

The validity score calculation module 224 can be configured to receive a signal including web content associated with a fetch response and calculate a webpage validity score for the webpage associated with that fetch response. The validity score calculation module 224 can be configured to send a signal including a webpage address associated with a webpage to thumbnail generation module 226. In some embodiments, the validity score calculation module can be configured to send a signal including a webpage address associated with a webpage across a network to a thumbnail-generating entity (not shown in FIG. 2) such as that discussed in connection with FIG. 8.

The thumbnail generation module 226 can be configured to receive a signal including a webpage address associated with a webpage from the validity score calculation module 224. The thumbnail generation module 226 can be configured to generate a thumbnail image file of a webpage for later use by the webpage validation system 200. For example, a thumbnail image file may be used by webpage validation system 200 to output webpage validity score information to a display (not shown in FIG. 2), as in the described in connection with FIG. 3. Or, as another example, a thumbnail image file may be stored in a remote memory, such as the validity score database discussed in more detail in connection with FIG. 8. The thumbnail generation module can also or alternatively store a thumbnail image file to a local memory, such as the memory 230.

The batch module 228 can be configured to manage the scheduling and execution of one or more batch processes as discussed in more detail in connection with FIG. 10. A batch process can include the sending of a webpage request signal and receipt of a fetch response associated with the webpage by communication module 222, calculation of a webpage validity score by validity score calculation module 224, and generation of a thumbnail image file by thumbnail generation module 226. The batch module 228 can be configured to maintain the scheduling and execution of one or more batch processes. In some embodiments, the batch module can be configured to generate and output one or more reports including information associated with one or more batch processes.

Figure 3:
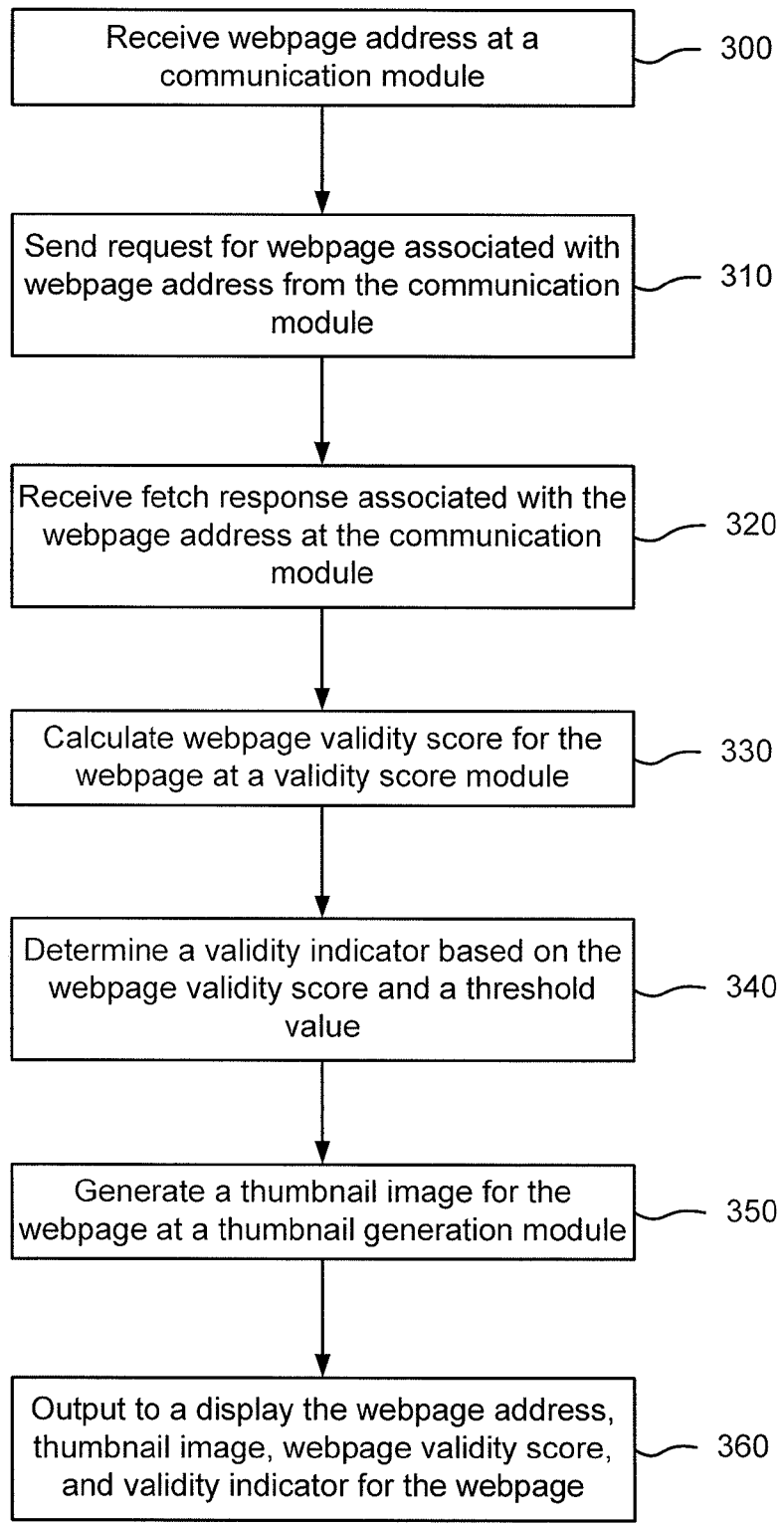
FIG. 3 is a flowchart that illustrates a method for determining a webpage validity score for a webpage and displaying that webpage validity score to a display along with a validity indicator and thumbnail image for the webpage, according to an embodiment.

FIG. 3 is a flowchart that illustrates a method for determining a webpage validity score for a webpage and displaying that webpage validity score to a display along with a validity indicator and thumbnail image for the webpage, according to an embodiment. As shown in FIG. 3, a webpage address can be received at a communication module, at 300. The webpage address can be, for example, a uniform resource locator (URL) or a domain name. If the webpage address is a domain name, the communication module can be configured to add characters to the domain name to define a complete URL. For example, the communication module can be configured to prepend URL text such as "www." to the domain name. In some embodiments, if the complete URL redirects to a separate domain, that separate domain will be used as the basis for separate validity score calculations in addition to that computed for the webpages of the original domain. The communication module can be, for example, similar to the communication module described in connection with FIG. 2.

A request for a webpage associated with the webpage address can be sent from the communication module, at 310. The webpage request can be defined based on at least a portion of the webpage address. In some embodiments, the webpage request can be defined such that it conforms to standard hypertext transfer protocol (HTTP) request format. In some embodiments, the webpage request can be sent over a network, such as a local area network, a wide area network, or the Internet. In some embodiments, the webpage request can be stored in a queue (not shown) in the communication module for later transmission.

A fetch response associated with the webpage address can be received at the communication module, at 320. In some embodiments, the fetch response can include a fetch success indicator or a fetch failure indicator. In some embodiments, the fetch response can include content associated with the webpage address and the webpage. In some embodiments, the fetch response can include an HTTP status code.

A webpage validity score for the webpage can be calculated at the validity score calculation module, at 330. In some embodiments, the validity score calculation module can be similar to the validity score calculation module discussed in connection with FIG. 2. In some embodiments, the webpage validity score can be calculated in a process similar to that discussed in connection with FIG. 4, discussed below. In some embodiments, the validity score calculation module can be included in a software module residing on the same hardware device as the communication module. In some embodiments, the validity score calculation module can reside on a hardware device different from the hardware device on which the communication module resides, the two hardware devices being connected for example by a wired or wireless network connection.

A validity indicator can be determined based on the webpage validity score and a threshold value, at 340. In some embodiments, the threshold value can indicate a numeric value above which a webpage is considered to contain substantive content. The validity score calculation module can compare the validity score for the webpage and the threshold to determine if the webpage contains substantive content. In some embodiments, the validity indicator can include a determination based on whether the webpage resolves and/or the webpage validity score. In some embodiments, the validity indicator can have a textual value such as "does not resolve" if the webpage does not resolve, "substantive" if the webpage validity score indicates that the webpage contains substantive content, or "pay-per-click" if the webpage validity score indicates that the webpage is a pay-per-click webpage. In some embodiments, the validity indicator can have a numeric value.

A thumbnail image for the webpage can be generated at the thumbnail generation module, at 350. In some embodiments, the thumbnail generation module can be similar to the thumbnail generation module described in connection with FIG. 2. In some embodiments, the thumbnail image generation module can receive a webpage address associated with a webpage, for example, from a validity score calculation module. In some embodiments, if the fetch response includes information indicating an error or unsuccessful webpage address resolution, the thumbnail image generation module can be configured to generate a default error thumbnail image. In some embodiments, the thumbnail image generation module can be configured to save the generated thumbnail image to a memory, such as to a server connected via a network. In some embodiments, the thumbnail image generation module can be configured to output the thumbnail image to a display device.

The webpage address, thumbnail image, webpage validity score, and validity indicator for the webpage can be output to a display, at 360. The display could be, for example, a monitor, a television screen, or a projector.

Figure 4:
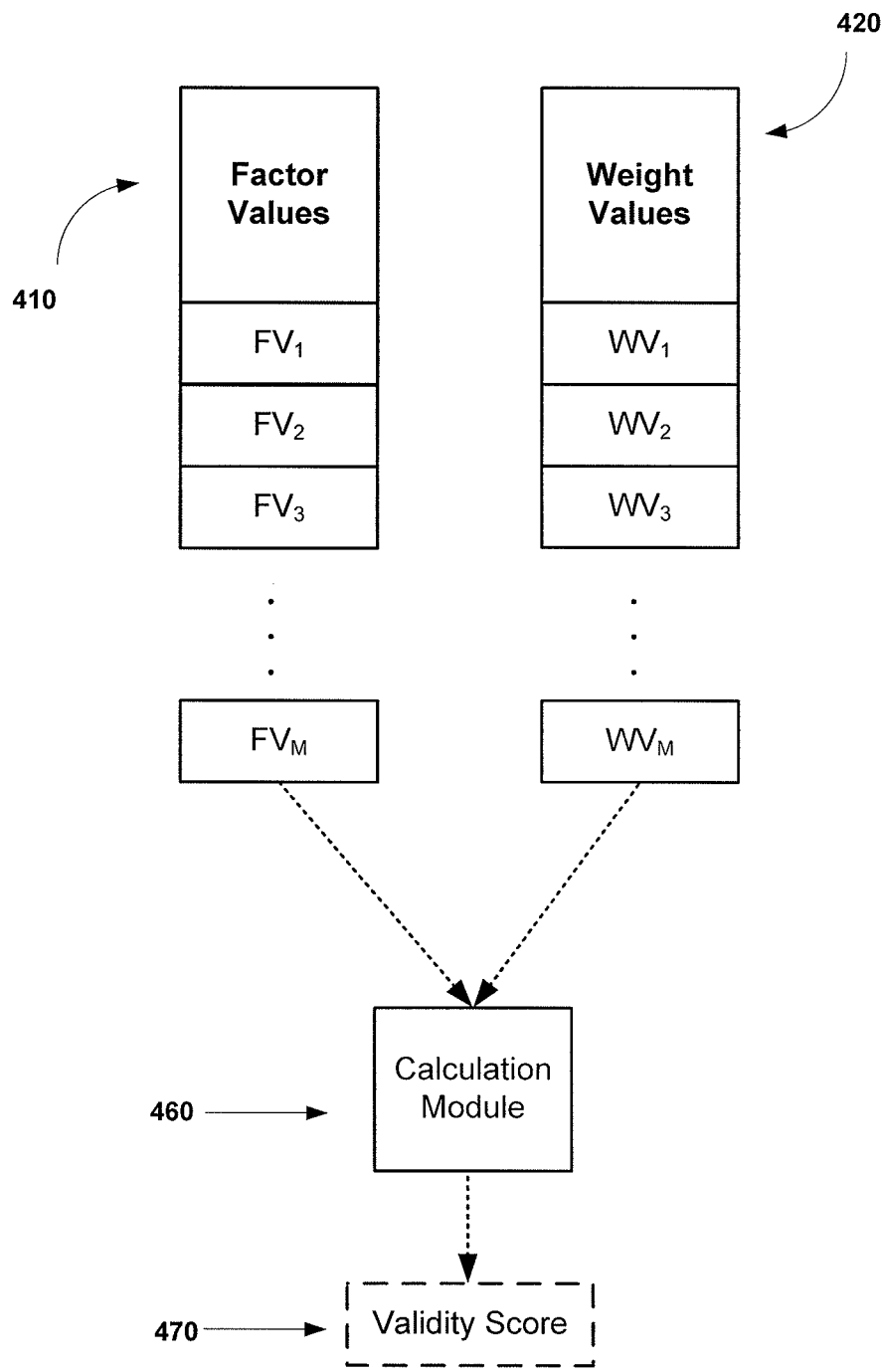
FIG. 4 is a schematic block diagram that illustrates a webpage validity score calculation, according to an embodiment.

FIG. 4 is a schematic block diagram that illustrates calculation of a webpage validity score 470 for a webpage, according to an embodiment. Component parts of the calculation can include one or more factor values 410, one or more weight values 420, and a calculation module 460 for algorithmically combining the factor values 410 and weight values 420 to determine the validity score 470. In some embodiments, the webpage validity score calculation is at least in part executed by a validity score calculation module (not shown) such as that discussed in relation to FIG. 2.

The factor values 410 can include one or more values that contribute to the holistic determination of the validity of a webpage. The factor values 410 can include, for example, a value representing a ratio of hyperlinks in the webpage to content in the webpage. The factor values 410 can include a value representing a ratio of external hyperlinks in a webpage to the total number of hyperlinks in a webpage. Additionally, the factor values 410 can include an indicator of whether the number of inbound links from a search engine to the webpage is greater than an inbound link threshold value. The factor values 410 can additionally include an indicator of whether a webpage contains certain types of substantive webpage content such as mailto content, Adobe Flash or Microsoft Silverlight content, Adobe PDF content, HTML frames content, or other specified type of web content. In some embodiments, the factor values 410 can include, for example, an indicator of whether a favicon associated with a webpage resolves successfully. The factor values 410 can additionally include whether DNS mail exchanger (MX) records for the domain associated with the webpage indicate that the webpage contains substantive content.

The weight values 420 can include one or more numeric values, the magnitude of which indicates the proportional contribution made by that weight value's corresponding factor in determining the validity of a webpage. The weight values 420 can be, for example, integer or real number coefficient values. Each weight value $WV_M$ can represent the impact in determining webpage validity of the factor represented by that weight value's corresponding factor value $FV_M$. For example, for a given factor value $FV_1$ of greater relative importance in a webpage validity calculation than factor value $FV_2$, the value of weight $WV_1$ can be proportionally greater than the value of weight $WV_2$.

Calculation module 460 can be configured to use the factor values 410 and weight values 420 to calculate the validity score 470. In some embodiments, the factor values 410 can follow a "fake golf scoring" paradigm, wherein factor values that indicate the presence of substantive content receive a negative (below zero) value and factor values that indicate a potential pay-per-click webpage receive a positive (above zero) value in the calculation. The calculation module 460 can mathematically combine each factor value from factor values 410 with its corresponding weight value from weight values 420. The calculation module 460 can multiply each weight value $WV_M$ from weight values 420 by its corresponding factor value $FV_M$ from factor values 410 as part of the validity score calculation to produce a series of weighted factor values (not shown). In the illustrated embodiment, the calculation module 460 can combine this series of weighted factor values to calculate the final validity score 470.

Figure 5:
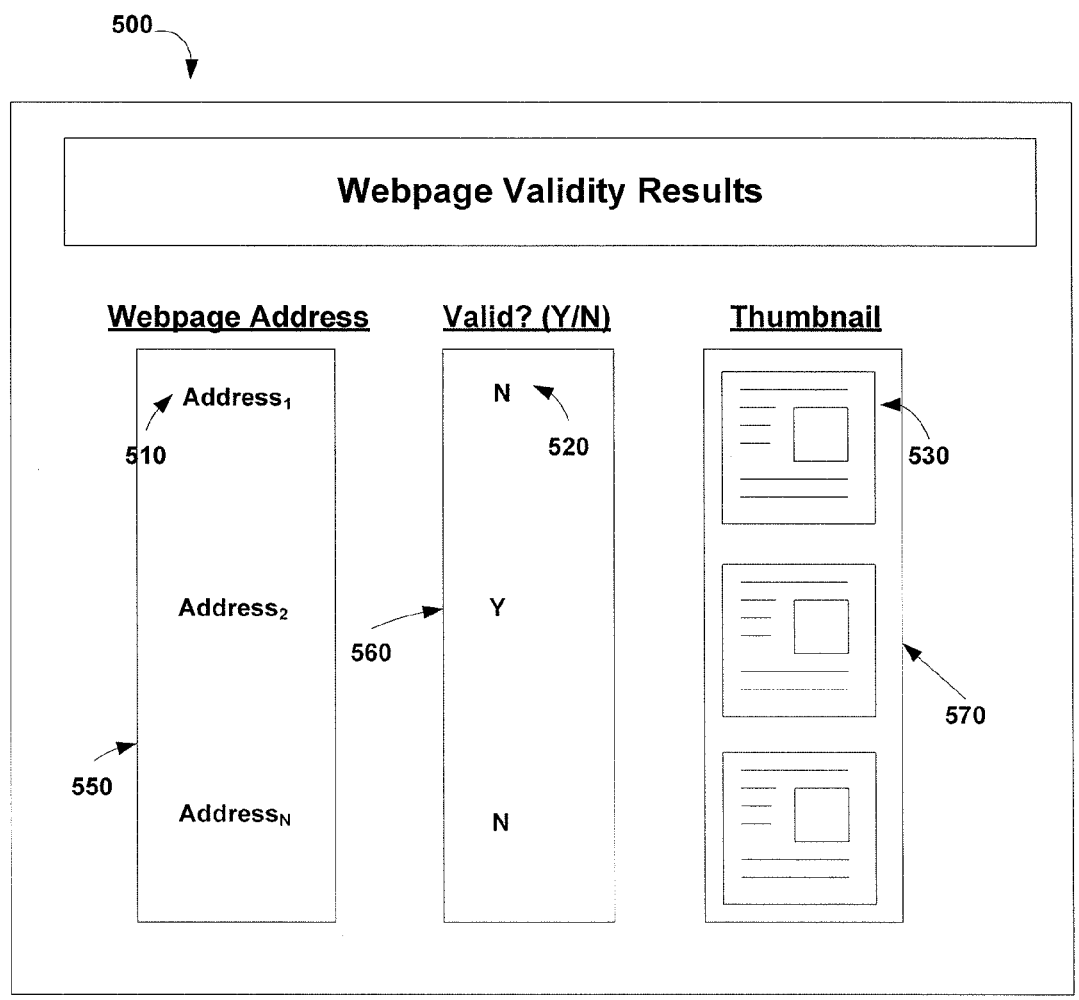
FIG. 5 is a diagram that illustrates a validity score reporting screen, according to an embodiment.

FIG. 5 is a diagram that illustrates a validity score reporting screen 500, according to an embodiment. More specifically, FIG. 5 illustrates a validity score reporting screen 500 configured to display one or more webpage addresses 550, one or more validity indicators 560, and one or more thumbnail images 570.

In some embodiments, webpage addresses 550 can be text values that indicate the webpage address or uniform resource locator (URL) of a tested webpage. For example, the webpage addresses 550 could be webpage addresses including the http:// prefix, a domain name, and top-level domain (TLD) suffix such as .com, .net., org., .gov, etc.

Validity indicators 560 can be text values that indicate whether a webpage contains substantive content. In some embodiments, the validity indicators 560 can be based on the webpage validity score for a given webpage, as with the validity indicator discussed in connection with FIG. 3. For example, in validity score reporting screen 500, the validity indicator 520 can be a text value that indicates whether the webpage associated with the webpage address 510 contains substantive content. In the illustrated embodiment, validity indicators 560 can contain the value "does not resolve" if the webpage does not resolve, "substantive" if the webpage is scored as substantive, or "pay-per-click" if the webpage scored as a pay-per-click webpage.

In some embodiments, a validity indicator can be edited by a user to override the programmatically-determined validity indicator. For example, the validity indicator could be edited by a user via typical input methods such as mouse or keyboard input. In some embodiments, a signal including a user-entered change to a validity indicator value can be sent to a validity score database (discussed in FIG. 6 below) to update the validity indicator value in the database row associated with the corresponding webpage address and webpage validity score.

Thumbnail images 570 can be graphical images that visually represent the graphical look of a webpage when rendered in a web browser. For example, thumbnail image 530 can represent the graphical look of the webpage associated with webpage address 510 when rendered in a web browser.

In some embodiments, the validity score reporting screen 500 can be generated by a communication module similar to the communication module discussed in connection with FIG. 2. In some embodiments, the validity score reporting screen can be output following the calculation of a validity score for one or more webpages associated with webpage addresses 550. In some embodiments, the validity score reporting screen can be output in response to user input, such as a mouse click. The validity score reporting screen 500 can be output to, for example, a display device, such as a computer monitor, a television, a cellular telephone screen, a personal digital assistant (PDA) screen, or video projector.

FIG. 6 is a tabular diagram that illustrates a validity score database configured to store website validity score information, according to an embodiment. As shown in FIG. 6, a webpage address (column 610) for which a validity score has been calculated can have a corresponding webpage validity score value (column 620). As further shown in FIG. 6, a webpage address (column 610) can additionally have a corresponding validity indicator (column 630), dependent on the validity score (column 620), and corresponding to that webpage address. Additionally, as shown in FIG. 6, a webpage address (column 610) can have a corresponding thumbnail image. The location in a memory of this thumbnail image can be specified by a corresponding thumbnail file location (column 640).

In some embodiments, the validity score database 600 can be included in a database residing on the same hardware device as a validity score module (not shown in FIG. 6) such as that discussed above in connection with FIG. 2. In some embodiments, the validity score database can be included in a database residing on a second hardware device different from the first hardware device on which the validity score module resides, with the first hardware device and the second hardware device configured to communicate over a network.

In some embodiments, the validity score database 600 can receive values for a webpage address (column 610), a validity score (column 620), a validity indicator (column 630), and a thumbnail file location (column 640) following the calculation of a validity score and generation of a thumbnail image for the webpage associated with the webpage address. In some embodiments, the validity score database can provide data for reports, such as a validity score report display screen (not shown) similar to that discussed above in connection with FIG. 5.

FIG. 7 is a tabular diagram that illustrates a pay-per-click affiliation database, according to an embodiment. As shown in FIG. 7, a registrar name (column 710), registrant name (column 720) and name server (column 730) associated with a registrar, registrant, or name server known to have often been affiliated with a pay-per-click webpage can be included in a row in the pay-per-click affiliation database 700. In some embodiments, the registrar name, registrant name and name server can be stored in a format other than the exemplary row and column tabular format discussed herein.

In some embodiments, the registrar name (column 710), registrant name (column 720) and name server address (column 730) can be included in a database that resides on the same hardware device as a validity score module (not shown in FIG. 7) such as that discussed in connection with FIG. 2. In other embodiments, the three above-mentioned fields can be included in a database that resides on a second hardware device different from the first hardware device on which the validity score module resides, the first hardware device and the second hardware device configured to communicate over a network.

In some embodiments, the pay-per-click affiliation database 700 can be referenced during a webpage validity score calculation to determine if the name of the registrar, registrant, or name server for that webpage is among those known to have previously been associated with a threshold number of pay-per-click webpages. If the name of the webpage registrar, webpage registrant, or webpage name server address is included in a row entry in the pay-per-click affiliation database 700, a validity score calculation module (such as that discussed in connection with FIG. 2) can optionally set a factor value to reflect that fact, thereby impacting the calculated validity score. In some embodiments, the validity score calculation module can be configured to give a different weight to each of the three columns, based at least in part on the degree to which a given registrar, registrant, or name server having been associated with a pay-per-click site impacts the likelihood that a subsequent website affiliated with that registrar, registrant, or name server will be a pay-per-click site.

The pay-per-click affiliation database 700 can receive a registrar name, registrant name and name server address for insertion into a new row in the registrar name column 710, registrant name column 720 and name server column 730, respectively. For example, when a validity score module has determined that a webpage has received a validity scored indicating that it is a pay-per-click webpage, the validity score module can be configured to send a signal to the pay-per-click affiliation database 700 that includes a database insertion instruction to include the name of the registrar of that webpage, the name of the registrant of the webpage and the name server address associated with that webpage. An intermediate calculation can be performed prior to database insertion. For example, if a webpage receives a validity score indicating that it is a pay-per-click webpage, the validity score module can be configured to determine how many times previously the registrant, registrar or name server associated with the webpage has been associated with other pay-per-click sites. If, for example, the number of times the registrant, registrar or name server has been associated with a pay-per-click site relative to the number of times the registrant, registrar or name server has been associated with substantive sites is below a predetermined threshold, the validity score module can be configured to not make an insertion into the pay-per-click affiliation database 700.

Figure 8:
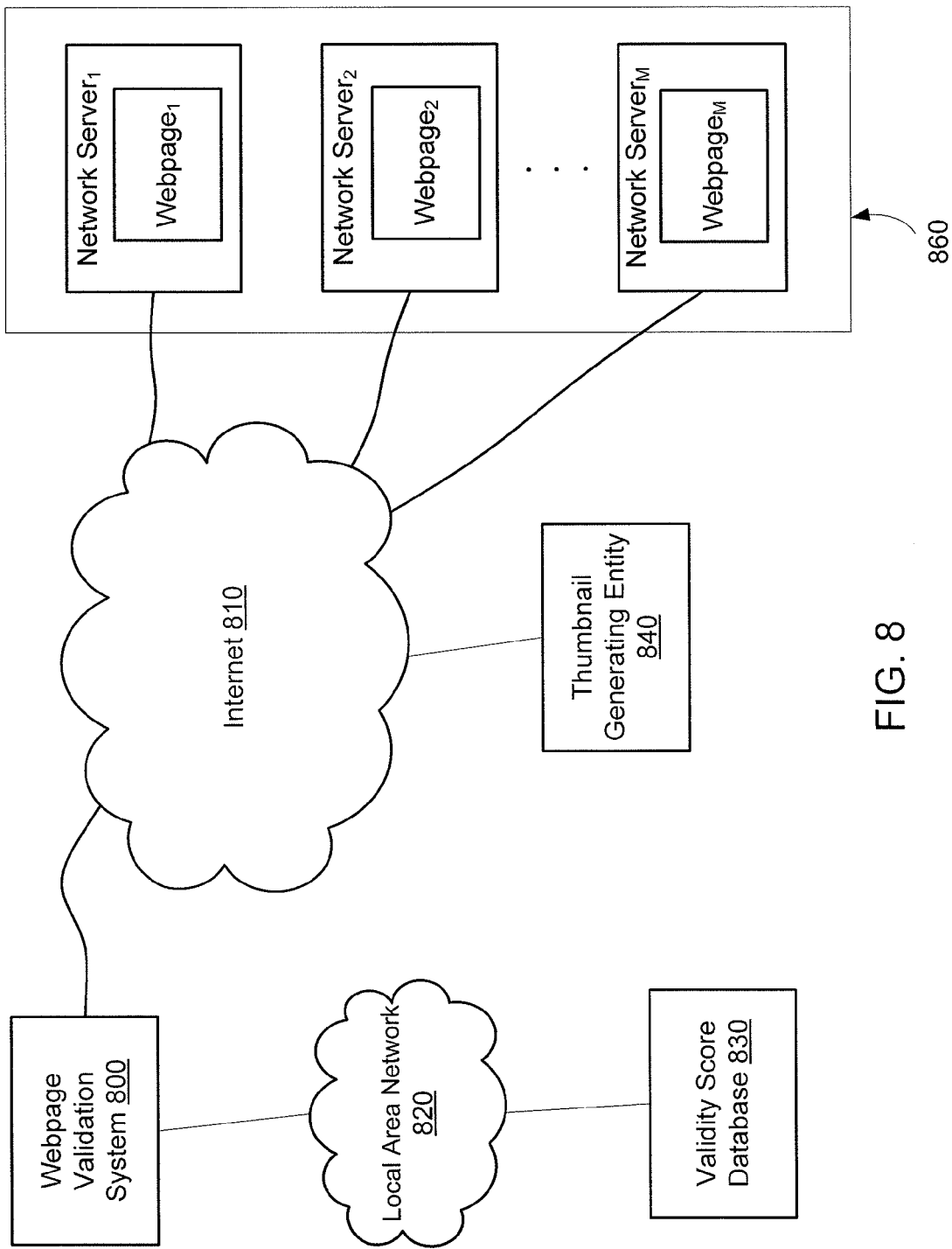
FIG. 8 is a schematic diagram that illustrates a webpage validation system coupled to a validity score database over a local area network and to both multiple network servers and a thumbnail generating entity over the Internet, according to an embodiment.

FIG. 8 is a schematic diagram that illustrates a webpage validation system coupled to a validity score database over a local area network and to both multiple network servers and a thumbnail generating entity over the Internet, according to an embodiment. Specifically, FIG. 8 illustrates a webpage validation system 800 configured to communicate with a validity score database 830 via a local area network 820, to communicate with a thumbnail generating entity 840 via the Internet, and to communicate with network servers 860 containing webpages $Webpage_1$ to $Webpage_M$.

The webpage validation system 800 can be, for example, a software-based module residing on a hardware device (e.g., a processor) or in a memory (e.g., a RAM, a ROM, a hard disk drive, an optical drive, other removable media) coupled to a processor. In some embodiments, the webpage validation system could be a hardware-based module (e.g., a processor, an application-specific integrated circuit (ASIC), a field programmable gate array (FPGA)). The network 820 could be, for example, a local area network, a wide area network, or the Internet. The network servers 860 can be web servers, or, in some embodiments, other devices capable of serving web content. The webpages $Webpage_1$ to $Webpage_M$ could each be, for example, a Hypertext Markup Language (HTML) document, a Common Gateway Interface (CGI) script, a Microsoft Active Server Page (ASP), a Java Server Page (JSP), a ColdFusion Markup Language (CFML) document, a PHP script, or other web document viewable by a web browser.

The webpage validation system 800 can be configured to send a webpage request for a webpage $Webpage_1$ to $Network Server_1$ across the Internet 810. The webpage validation system 800 can be further configured to receive a fetch response associated with the webpage $Webpage_1$ from $Network Server_1$ via the Internet 810. The webpage validation system 800 can be further configured to calculate a webpage validity score for the webpage $Webpage_1$. In some embodiments, the webpage validation system 800 can be configured to define a validity indicator based on the webpage validity score, as discussed in connection with FIG. 3.

The webpage validation system 800 can be further configured to send a signal including a webpage validity score to a validity score database 830 via a local area network 820. In some embodiments, the local area network could employ Ethernet, Wi-Fi, WiMax, or other networking technologies to connect network nodes. In some embodiments, the local area could be a wide area network or the Internet.

The webpage validation system 800 can be configured to send a signal including a request for information from validity score database 830 across the local area network 820. The signal can include, for example, a request for validity score information (such as the webpage validity score and/or validity indicator) associated with a particular webpage address. In some embodiments, the webpage validation system could be configured to receive a signal from the validity score database 830 including the validity score information.

For example, the webpage validation system 800 could send a signal including a webpage validity score to the validity score database 830 during execution of a batch process (as discussed in connection with FIG. 10 below), and then send a signal requesting that same webpage validity score and related information from the validity score database 830 during generation of a completed batch report (not shown in FIG. 8).

The webpage validation system 800 can be configured to send a signal including a thumbnail image request to a thumbnail-generating entity 840 across the Internet 810. In some embodiments, the thumbnail image request could include a webpage address used by the thumbnail-generating entity to generate a thumbnail image of the webpage associated with that webpage address. In some embodiments, the thumbnail generating entity could be configured to send a response signal to the webpage validation system over the Internet. In some embodiments the response signal could include the thumbnail image of the webpage associated with the webpage address included in the thumbnail image request.

The webpage validation system 800 can be configured to send a signal to a display device including the webpage validity score, the validity indicator, and the thumbnail image received from the thumbnail-generating entity 840 such as in the validity score report (not shown) discussed in connection with FIG. 3.

Figure 9:
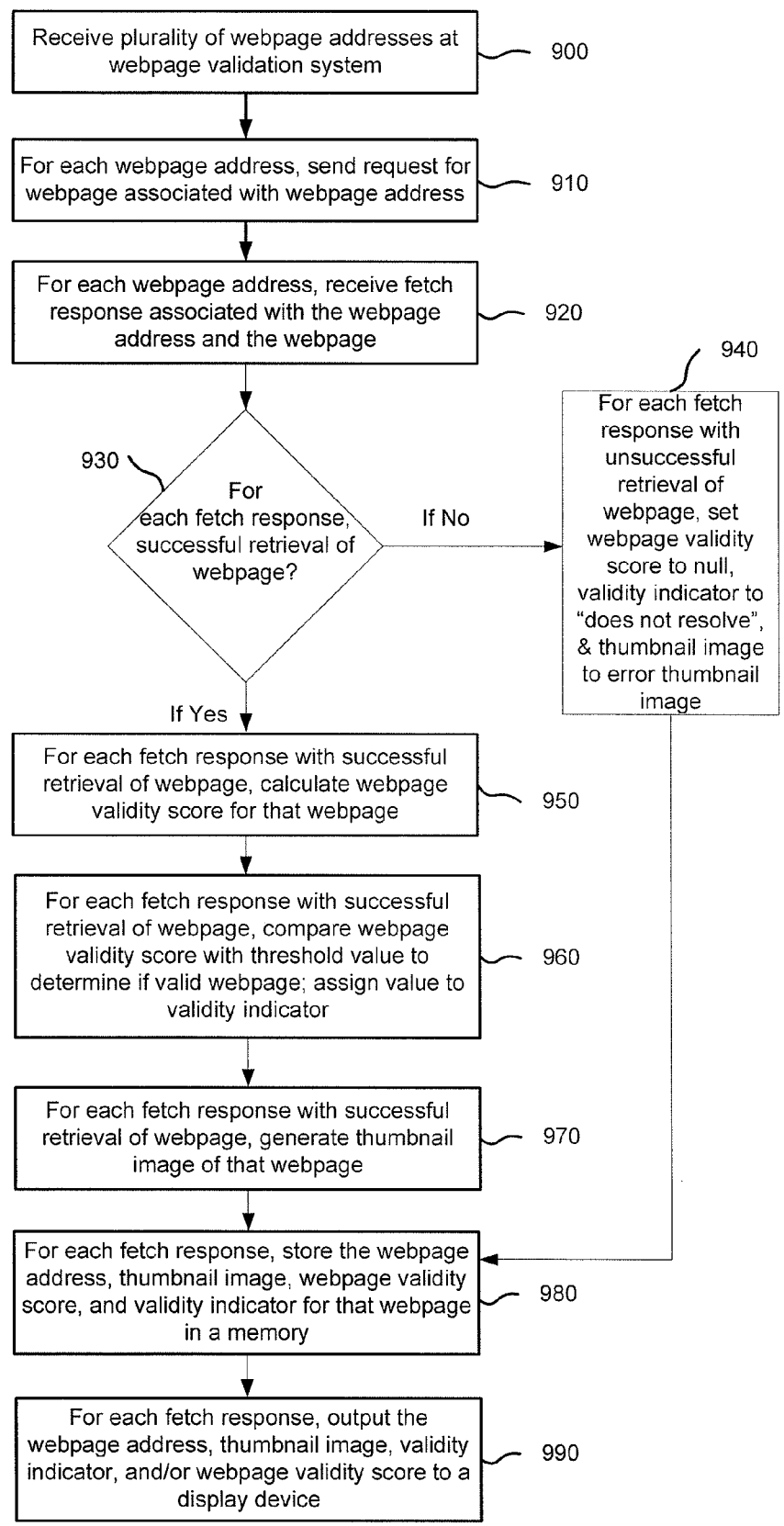
FIG. 9 is a flowchart that illustrates a method for determining the validity of multiple webpages, generating thumbnail images for the webpages, and storing the webpage address, thumbnail image, webpage validity score, and a validity indicator for each webpage to a memory, according to an embodiment.

FIG. 9 is a flowchart that illustrates a method for determining the validity of multiple webpages, generating thumbnail images for the webpages, and storing the webpage address, thumbnail image, webpage validity score, and a validity indicator for each webpage to a memory, according to an embodiment. In some embodiments, the method as illustrated in FIG. 9 can be referred to as a batch process as discussed in connection with FIG. 10 (discussed below).

As shown in FIG. 9, multiple webpage addresses can be received at a webpage validation system, at 900. In some embodiments, multiple webpage addresses can be received by user input, in a text file, by local or remote database query, or over a network. In some embodiments, multiple webpage addresses can include one or more uniform resource locators (URLs) or one or more domain names.

In some embodiments, multiple webpage addresses can be received at a first hardware device different from the second hardware device on which the webpage validation system resides. In this embodiment, multiple webpage addresses can be sent from the first hardware device to the second hardware device for use by the webpage validation system.

For each webpage address from multiple webpage addresses, a request for the webpage associated with that webpage address can be sent, at 910. In some embodiments, the request can be sent over a network, such as a local area network, a wide area network, or the Internet.

For each webpage address from multiple webpage addresses, a fetch response associated with that webpage address and the webpage associated with that webpage address can be received, at 920. In some embodiments, one or more of the fetch responses can include status information for that fetch response, such as, for example, an indicator of a failed webpage request or an indicator of a successful webpage request. The status information could be, for example, an HTTP status code. In some embodiments, an indicator of a failed webpage request can include further information detailing the apparent cause of the failed webpage request.

For each fetch response, a determination can be made as to whether that fetch response contains a successfully retrieved webpage, at 930. In some embodiments, this determination can be made by referencing the status information for that fetch response.

For each fetch response that does not include a successfully retrieved webpage, the webpage validity score can be set to null, the validity indicator can be set to "does not resolve", and the thumbnail image file can be set to a default error thumbnail image file, at 940.

For each fetch response that includes a successfully retrieved webpage, a webpage validity score for that webpage can be calculated, at 950. In some embodiments, the webpage validity score calculation can be similar to the calculation (not shown in FIG. 9) described in connection with FIG. 4, including one or more factor values and one or more weight values based on the content of the webpage.

For each fetch response that includes a successfully retrieved webpage, the calculated webpage validity score for that webpage can be compared with a threshold value to determine if that webpage contains substantive content, and a value can be assigned to a validity indicator for that webpage, at 960. In some embodiments, the validity indicator can include information indicating if that webpage contains substantive content. In some embodiments, the information can include a numeric value or one or more words, such as "substantive", "invalid", "pay-per-click", etc.

For each fetch response that includes a successfully retrieved webpage, a thumbnail image can be generated for that webpage, at 970. In some embodiments, one or more of the thumbnail images can be generated at the same hardware device where the webpage validation system resides. In some embodiments, one or more of the thumbnail images can be generated at a third hardware device connected via a network to the first hardware device where the webpage validation system resides.

For each fetch response, the webpage address associated with that webpage, the thumbnail image for that webpage, the validity score for that webpage, and the validity indicator for that webpage can be stored in a memory, at 980. In some embodiments, the memory can be a database, such as a relational database. In some embodiments, the memory can reside on the same hardware device as the webpage validation system. In some embodiments, the memory can reside on a fourth hardware device, connected via a network to the first hardware device on which the webpage validation system resides.

For each fetch response, the webpage address, thumbnail image, and validity indicator, and/or validity score associated with the webpage associated with that fetch response can be output to a display device, at 990. In some embodiments, the above information, excluding the thumbnail image, can be output to a display device or stored to a memory in Microsoft Excel format in landscape orientation. In some embodiments, the above information can be output to a display device or stored to a memory in Adobe PDF format.

Figure 10:
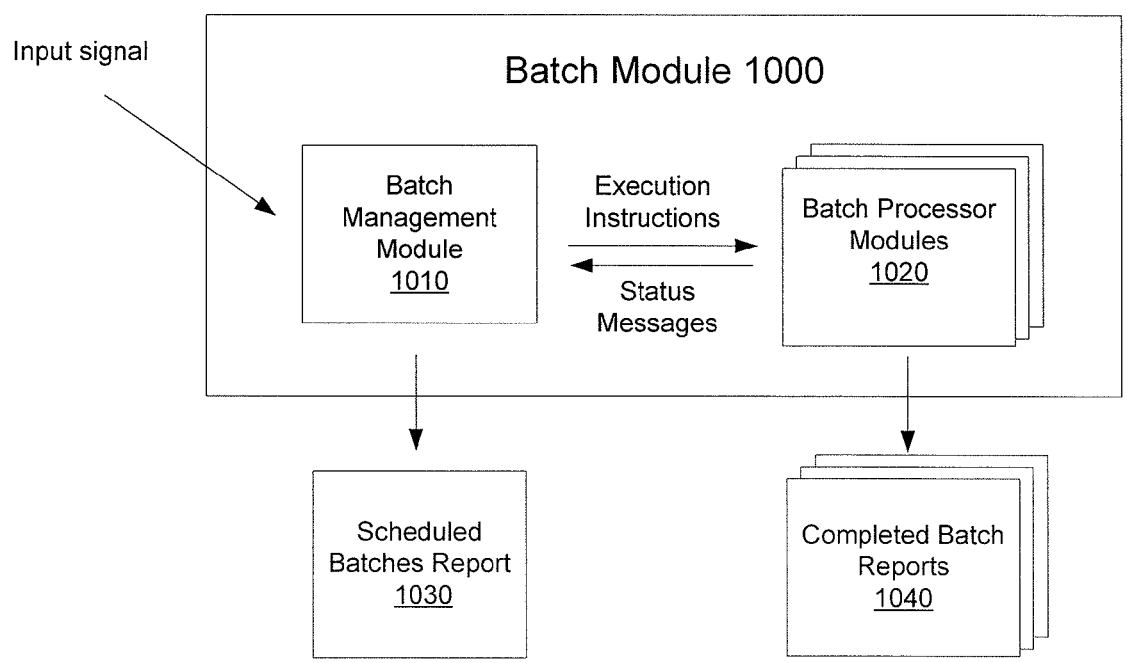
FIG. 10 is a schematic block diagram that illustrates a batch module for executing batch processes of validity score calculations for a plurality of webpage addresses, according to an embodiment.

FIG. 10 is a schematic block diagram that illustrates a batch module for executing batch processes of validity score calculations for multiple webpage addresses, according to an embodiment. More specifically, FIG. 10 illustrates batch module 1000 configured to include a batch management module 1010 and one or more batch processor modules 1020. Batch management module 1010 is configured to generate scheduled batches report 1030. The one or more batch processor modules 1020 are configured to generate one or more completed batch reports 1040. In some embodiments, a batch can be defined as a sequence including at least the receiving webpage addresses, the sending of webpage requests, and the calculation of webpage validity scores as discussed in connection with FIG. 9.

In some embodiments, the batch module 1000 can be a hardware-based module (e.g., a processor, an application-specific integrated circuit (ASIC) or a field programmable gate array (FPGA)). In some embodiments, the batch module 1000 can be a software-based module residing on a hardware device (e.g., a processor) or in a memory (e.g., a RAM, a ROM, a hard disk drive, an optical drive, other removable media) coupled to a processor. In some embodiments, the batch module 1000 can be included in a webpage validation system, such as that discussed in connection with FIG. 2. In some embodiments, batch management module 1010 and batch processor modules 1020 can each be either hardware-based or software-based.

The batch management module 1010 can be configured to send one or more execution instruction signals to one or more batch processor modules 1020. In some embodiments, the execution instruction signals can include multiple webpage addresses and a signal instructing the execution of a batch process by a batch processor module. In some embodiments, the execution instruction signals can be sent within a single hardware device. In some embodiments, the execution instruction signals can be sent over a network to a second hardware device on which the batch processor modules 1020 reside.

The batch processor modules 1020 are configured to receive one or more execution instruction signals from batch management module 1010. Upon receipt of an execution instruction signal, a batch processor module from batch processor modules 1020 initiates a batch process of calculating a webpage validity score for one or more webpages, such as that described in connection with FIG. 9. In some embodiments, a batch processor module from the batch processor modules 1020 can be configured to send one or more status message signals to the batch management module 1010 during the execution of a batch process. These status message signals can include, for example, status information indicating the progress of a batch process. A status message can include, for example, an indication that a batch process is scheduled, currently executing, or completed. In some embodiments, batch management module 1010 can be configured to receive one or more status message signals from batch processor module 1020. In some embodiments, batch management module 1010 can be configured to include the status message signal information as part of a scheduled batches report 1030 (discussed below).

In some embodiments, the batch processor modules 1020 can be configured to generate one or more completed batch reports 1040. Upon completion of a batch process, a batch processor module from the batch processor modules 1020 can be configured to generate a report that includes, for example, status information relating to the completed batch process, and, for each webpage address associated with the batch process, validity score information, such as the validity score, validity indicator, and thumbnail image discussed in connection with FIG. 5. In some embodiments, the batch processor modules 1020 can generate the completed batch reports 1040 in a number of various formats. For example, the completed batch reports 1040 could be output as a text document, an electronic mail message, a web page, an Adobe Portable Document Format (PDF) file, etc.

The batch management module 1010 can be further configured to provide functionality that allows a user to schedule a batch process for future execution. In some embodiments, the batch management module 1010 can provide a schedule new batch screen, which could include, for example, fields such as batch process execution date, batch process client name, and a list of batch process URLs. In some embodiments, the user can input values for some or all of the above fields via keyboard and or mouse input devices. In some embodiments, the batch management module 1010 can be configured to receive values for some or all of the above fields and use the fields to schedule a new batch process.

The batch management module 1010 can be further configured to receive a scheduled batches report request. In some embodiments, the request can be received via user input, from another software- or hardware-based module, or via a network signal. Upon receipt of a scheduled batches report request, the batch management module 1010 can be configured to generate a report including a listing of batches scheduled for execution by a webpage validation system (not shown), such as that discussed in connection with FIG. 2. In some embodiments, the scheduled batches report can provide functionality to allow a user to edit information concerning a scheduled batch process. For example, the scheduled batches report could provide functionality to allow a user to cancel a pending batch process, change the execution date of a pending batch process, or edit other information associated with the scheduled batch process, such as the client name. In some embodiments, the scheduled batches report can be output to a visual display device, such as a screen or a projector. In some embodiments, the scheduled batches report can be stored in a memory such as a hard disk drive, a RAM, a ROM, removable storage device, or one or more databases. In some embodiments, the scheduled batches report can be transmitted over a network to, for example, one or more electronic mail accounts or to a hardware device.

The batch management module 1010 can be further configured to generate one or more customized completed batch reports. In some embodiments, the batch management module 1010 can be configured to receive user report field selections from among, for example, the following fields: domain name, URL, TLD, batch identification number, batch date, batch creator, batch status, and batch creation date. In some embodiments, the batch management module 1010 can be configured to allow a user to edit the value of one or more of the following field values for a given webpage address in a customized completed batch report: domain name, validity calculation date, thumbnail image, registrar name, registrant name, name server address, HTTP status code, validity score, validity indicator, and comment text.

Figure 11:
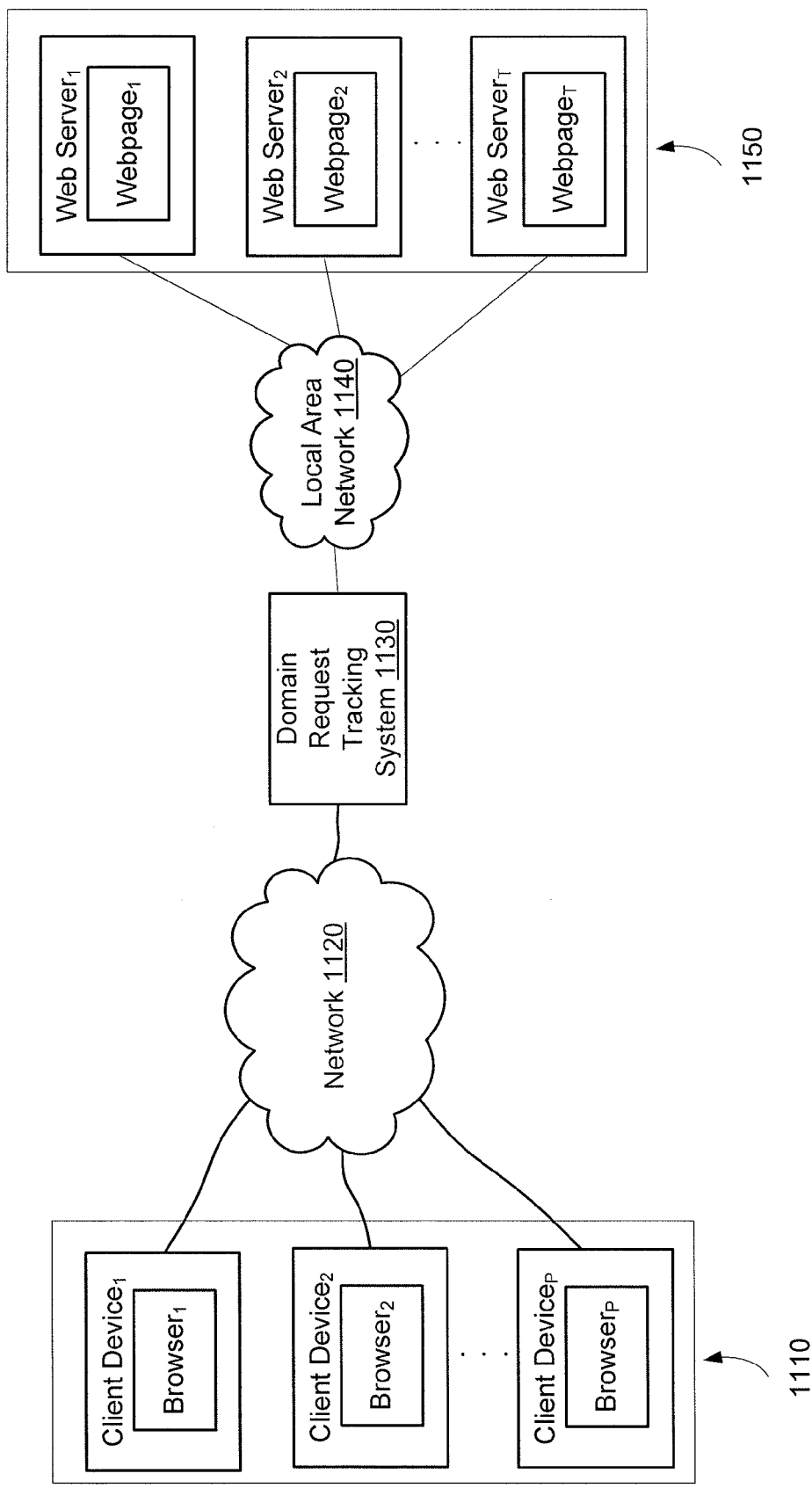
FIG. 11 is a schematic diagram that illustrates a domain request tracking system coupled to the Internet and one or more web servers, according to an embodiment.

FIG. 11 is a schematic diagram that illustrates a domain request tracking system coupled to the Internet and one or more web servers, according to an embodiment. Specifically, FIG. 11 illustrates a domain request tracking system 1130 configured to communicate with client devices 1110 over the Internet 1120 and web servers 1150 over a local area network 1140.

Client devices 1110 can be, for example, any device capable of accessing content across a network, such as a personal computer, a cellular telephone, a personal digital assistant (PDA), or other network-capable hardware device. In some embodiments, browsers Browser$_1$ to Browser$_P$ can be any hardware or software package connected to or running on a client device capable of requesting content over a network. In some embodiments, a browser from Browser$_1$ to Browser$_P$ could be a web browser such as Microsoft Internet Explorer, Mozilla Firefox, Apple Safari, or Opera. Network 1120 can be, for example, a local area network, a wide area network, or the Internet.

The domain request tracking system 1130 can be, for example, a hardware-based module (e.g., a processor, an application-specific integrated circuit (ASIC), a field programmable gate array (FPGA)). In some embodiments, the domain request tracking system can be a software-based module residing on a hardware device (e.g., a processor) or in a memory (e.g., a RAM, a ROM, a hard disk drive, an optical drive, other removable media) coupled to a processor.

The local area network 1140 can employ, for example, Ethernet, Wi-Fi, WiMax, or other networking technologies to connect network nodes. In some embodiments, the local area network 1140 can be a wide area network or the Internet.

The web servers 1150 can be web server software installed on individual devices, across multiple devices, or multiple web server processes running on a single device. The webpages Webpage$_1$ to Webpage$_T$ can each be a Hypertext Markup Language (HTML) document, a dynamically-generated webpage defined by a JSP, ASP, PHP, ColdFusion, or other content engine, a multimedia item such as an image, a sound clip, a video clip, an Adobe Flash file, or other resource retrievable by a web browser.

The domain request tracking system 1130 can be configured to receive multiple webpage requests from one or more client devices 1110, via the network 1120. The webpage requests can each include a webpage address associated with a unique webpage, with each webpage address including a domain name. The domain request tracking system 1130 can be further configured to calculate a total number of webpage requests received for each domain name and/or web page address included in the multiple webpage addresses.

For each of the multiple webpage requests, the domain request tracking system 1130 can be configured to send a signal via local area network 1140 to the web server from the web servers 1150 that stores the webpage associated with that webpage request, with each signal including a request for that webpage. The domain request tracking system 1130 can be further configured to receive multiple signals including the requested webpages from the various web servers 1150 via the local area network 1140, and to send a signal for each webpage to the client device that originally requested it, via the network 1120.

In some embodiments, the domain request tracking system 1130 can be configured to generate one or more reports (not shown) detailing the total number of webpage requests received for each domain name. The one or more reports can be stored to a memory (not shown) connected to the domain request tracking system locally or over a network. In some embodiments, the domain request tracking system 1130 can be configured to output the one or more reports to a visual display such as a monitor or projector. For example, the domain request tracking system 1130 could be configured to output report detailing the total number of webpage requests received for a given domain. This report could be sent via a network to the screen of a client device such as those from client devices 1110, or to the screen of a client device connected to the domain request tracking system 1130 via a local area network.

Although the embodiments described herein discuss webpages and webpage addresses, it should be understood that some embodiments could be related to, for example, any type of network content, such as text or word processor documents, media presentations, and the like.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory computer-readable medium comprising code representing instructions to cause a professor to:
    receive a fetch response based webpage address, the webpage address being uniquely associated with a webpage;
    calculate a webpage validity score for the webpage, webpage validity score based on at least:
        a ratio of external hyperlinks in the webpage to the hyperlinks in the webpage; and
        a degree of presence of advertising links in the webpage; and
    send a signal to display in response to the fetch response (1) an indicator based on the webpage validity score and a first threshold value, and (2) a thumbnail image of the webpage.

2. The non-transitory computer-readable medium of claim 1, wherein the webpage is a first webpage and the webpage validity score is based at least in part on a uniform resource locator of a second webpage to which the webpage address resolves.

3. The non-transitory computer-readable medium of claim 1, wherein the indicator indicates that the webpage is a pay-per-click webpage if the validity score is less than the first threshold value, and
    the indicator indicates that the webpage is a substantive webpage if the validity score is not less than the first threshold value.

4. The non-transitory computer-readable medium of claim 1, wherein the first threshold value is a previously-stored score for the webpage, and the indicator is a webpage change indicator.

5. The non-transitory computer-readable medium of claim 1, further comprising code representing instructions to cause a processor to:
    add information of the webpage to a pay-per-click list if the webpage validity score is less than the first threshold value, the information comprising at least one of:
        registrar information of the webpage;
        registrant information of the webpage; and
        name server information of the webpage.

6. The non-transitory computer-readable medium of claim 1, wherein webpage validity score is based at least in part on at least one of:
    whether a number of inbound links from a search engine to the webpage is greater than a second threshold value;
    size in bytes of the webpage;
    metatags associated with the webpage; and
    whether the webpage includes at least one of:
        mailto content;
        Flash content;
        PDF content; or
        frames content.

7. The non-transitory computer-readable medium of claim 1, wherein the code to calculate includes code to calculate based on an inverse point scoring system.

8. A non-transitory computer-readable medium comprising code representing instructions to cause a processor to:
    receive a fetch response based on a webpage address, the webpage address being uniquely associated with a webpage;
    calculate a webpage validity score for the webpage, webpage validity score based on at least (1) a ratio of external hyperlinks in the webpage to the hyperlinks in the webpage and (2) a degree of presence of advertising links the webpage;
    send a signal to display in a first column and a row a thumbnail image of the webpage; and
    send a signal to display in a second column and the row a validity indicator, the validity indicator being based on the validity threshold value.

9. The non-transitory computer-readable medium of claim 8, further comprising code representing instructions to cause a processor to:
    send a signal including a thumbnail indicator and the validity indicator, the thumbnail indicator being based on the thumbnail image of the webpage, the signal configured to cause information based on the thumbnail indicator and the validity indicator to be displayed to a screen at a first time.

10. The non-transitory computer-readable medium of claim 8, wherein the code to store includes code to store the thumbnail image of the webpage and the validity indicator in a memory accessible via a network.

11. The non-transitory computer-readable medium of claim 8, further comprising code representing instructions to cause a processor to:
    receive a webpage validity score search query from a user, the webpage validity score search query including the webpage address; and
    send a signal to display in response to the query one or more of:
        the webpage address; and
        the validity score for that webpage.

12. The non-transitory computer-readable medium of claim 8, further comprising code representing instructions to cause a processor to:
    receive user input configured to cause the processor to edit a value in the memory for at least one of:
        the webpage address;
        the validity score for the webpage
        the validity indictor; and
        the thumbnail image of the webpage.

13. non-transitory computer-readable medium of claim 8, wherein the webpage address of webpage-address-formatting text and a domain name received from a user.

14. A non-transitory computer-readable medium comprising code representing instruction use a processor to:
    receive a plurality of webpage addresses at a first time;
    receive a plurality of fetch responses based at least in part on the plurality of webpage addresses, each fetch response from the plurality of fetch responses being uniquely associated with a webpage address from the plurality of webpage addresses, each fetch response from the plurality of fetch responses including webpage address resolution information; and
    send a signal to display a plurality of thumbnail images, each thumbnail image from the plurality of thumbnail images being uniquely associated with a fetch response from a portion of the plurality of fetch responses, each fetch response from the portion including webpage-address-resolution information indicating successful webpage resolution; and send a signal to display a plurality of webpage validity scores for the plurality of webpages, each webpage validity score from the plurality of webpage validity scores uniquely being associated with a fetch response from a portion of the plurality of fetch responses, each webpage validity score from the plurality of webpage validity scores based on at least (1) a ratio of external hyperlinks in the webpage to the hyperlinks in the webpage and (2) a degree of presence of advertising links in the webpage.

15. The non-transitory computer-readable medium of claim 14, further comprising code representing instructions to cause a processor to:
define a batch process containing the code to:
receive the plurality of webpage address at the first time;
receive the plurality of fetch responses; and
display the plurality thumbnail images;
define an execution time for the batch process; and
execute the batch process at the execution time.

16. The non-transitory computer-readable medium of claim 15, further comprising code representing instructions to cause a process to:
display to a screen an indicator of pending batch processes;
receive from a user a batch cancellation signal, the batch cancellation signal including a batch process identifier; and
cancel a pending batch process based at least in part on the batch cancellation signal.

17. The non-transitory computer-readable medium of claim 14, wherein the plurality of thumbnail images is received from a network coupled to a source.

18. The non-transitory computer-readable medium of claim 14, further comprising code representing instructions to cause a processor to:
store the plurality of thumbnail images, the plurality of webpage validity scores, and the plurality of webpage addresses to a memory.

19. The non-transitory computer-readable medium of claim 14, further comprising code representing instructions to cause a processor to:
display to an output device a listing of at least one of completed batch processes or scheduled batch processes.

20. The non-transitory computer-readable medium of claim 14, further comprising code representing instructions to cause a processor to:
receive from a user a completed batch search query; and
display to an output device a listing of completed batches that substantially match information included in the completed, batch search query.

21. The non-transitory computer-readable medium of claim 14, wherein the plurality of webpage addresses is received in one or more files received via a network.

22. The non-transitory computer-readable medium of claim 14, wherein the plurality of fetch responses are a first plurality of fetch responses, further comprising code representing instructions to cause a processor to:
receive a plurality of webpage requests from at least one device, each webpage request from the plurality of webpage requests including an address value and a domain value, a first webpage request from the plurality of webpage requests including a first domain value;
send a fetch request from a plurality of fetch requests in response to each webpage request from the plurality of webpage requests, each fetch request from the plurality of fetch requests including a single address value;
receive a second plurality of fetch responses;
send a plurality of webpage responses in response to each fetch response from the second plurality of fetch responses, each webpage response from the plurality of webpage responses configured to cause the at least one device to receive a single webpage; and
calculate a quantity of webpage requests from the plurality of webpage requests that include the first domain value.

23. The non-transitory computer-readable medium of claim 22, further comprising code representing instructions to cause a processor to:
for each webpage request from the playa e requests, if the address value included in that webpage request does not resolve, send a signal indicating that that address does not resolve.

* * * * *